(12) United States Patent
Oetjens et al.

(10) Patent No.: US 10,404,111 B2
(45) Date of Patent: Sep. 3, 2019

(54) MOTOR AND STATOR CRUSH RESISTANCE DEVICE

(71) Applicant: American Axle & Manufacturing, Inc., Detroit, MI (US)

(72) Inventors: Thomas J. Oetjens, Troy, MI (US); Yogesh Mehta, Rochester Hills, MI (US); Wei Li, Troy, MI (US); Jeffrey J. Ronning, Grosse Pointe Farms, MI (US); Lars Y. Hessman, Trollhättan (SE)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 91 days.

(21) Appl. No.: 15/830,136

(22) Filed: Dec. 4, 2017

(65) Prior Publication Data
US 2019/0173331 A1 Jun. 6, 2019

(51) Int. Cl.
*H02K 1/06* (2006.01)
*H02K 1/18* (2006.01)

(52) U.S. Cl.
CPC .................................. *H02K 1/185* (2013.01)

(58) Field of Classification Search
CPC .. H02K 5/04; H02K 5/22; H02K 5/02; H02K 1/185
USPC .............................. 310/89, 216.114, 400–432
See application file for complete search history.

(56) References Cited

U.S. PATENT DOCUMENTS

| 4,758,755 A | * | 7/1988 | Sherman | .................. | H02K 5/15 |
| | | | | | 310/402 |
| 7,196,438 B2 | | 3/2007 | Williams et al. | | |
| 8,973,251 B2 | | 3/2015 | Endo et al. | | |
| 9,379,589 B2 | | 6/2016 | Choji et al. | | |
| 9,397,541 B2 | | 7/2016 | Ikuta et al. | | |
| 9,444,293 B2 | | 9/2016 | Yoshinori et al. | | |
| 9,722,479 B2 | | 8/2017 | Nadeau et al. | | |
| 2009/0212655 A1 | * | 8/2009 | Miyairi | ..................... | H02K 5/10 |
| | | | | | 310/216.118 |
| 2012/0242186 A1 | * | 9/2012 | Hattori | .................... | H02K 1/185 |
| | | | | | 310/216.118 |
| 2013/0169080 A1 | | 7/2013 | Salamah et al. | | |
| 2013/0187517 A1 | * | 7/2013 | Asao | ...................... | H02K 1/185 |
| | | | | | 310/68 D |
| 2014/0239754 A1 | * | 8/2014 | Yoshinori | .............. | H02K 1/185 |
| | | | | | 310/54 |

* cited by examiner

*Primary Examiner* — Thanh Lam
(74) *Attorney, Agent, or Firm* — Harness, Dickey & Pierce, P.L.C.

(57) ABSTRACT

An electric motor can include a stator positioning device. First and second housing bodies can define a motor cavity. The stator can be disposed about the rotor within the motor cavity. The stator positioning device can include a plurality of contact members, and a plurality of cover members. The contact members can cooperate to form an annular contact ring that is coaxial with an output axis and has a first side and a second side. The first side can be in contact with a first end of the stator core. The cover members can cooperate to form an annular cover ring that is coaxial with the axis and coupled to the second side of the contact ring. The cover ring can include a flange that extends radially outward of the contact ring and is axially between the first and second housing bodies to inhibit axial movement of the cover ring.

20 Claims, 4 Drawing Sheets

MOTOR AND STATOR CRUSH RESISTANCE DEVICE

FIELD

The present disclosure relates to an electric motor and a stator crush resistance device.

BACKGROUND

Electric motors, such as those used in vehicle drivelines, can include a housing, and a stator received in the housing. The stator typically needs to be fixed relative to the housing. However, the stator can include a plurality of electrically conductive windings and other electrical connections that can extend axially outward from the stator core. These windings and connections can make it difficult to fix the stator to the housing using traditional fixing means, such as snap rings for example, since a snap ring would need to fit over these windings and connections in order to abut the stator core within the housing. Thus, there continues to be a need for improved stator positioning devices in electric motors.

SUMMARY

This section provides a general summary of the disclosure, and is not a comprehensive disclosure of its full scope or all of its features.

In one form, the present disclosure provides an electric motor including a first housing body, a second housing body, a rotor, a stator, and a stator positioning device. The second housing body can cooperate with the first housing body to define a motor cavity. The rotor can be supported within the motor cavity for rotation about an axis. The stator can be disposed about the rotor within the motor cavity. The stator can include a stator core having a first end. The stator positioning device can include a plurality of contact members, and a plurality of cover members. The contact members can cooperate to form an annular contact ring that is coaxial with the axis and has a first side and a second side. The first side can be in contact with the first end of the stator core. The cover members can cooperate to form an annular cover ring that is coaxial with the axis and coupled to the second side of the contact ring. The cover ring can include a cover flange that extends radially outward of the contact ring and is disposed axially between the first and second housing bodies to inhibit axial movement of the cover ring.

According to a further embodiment, the stator positioning device can further include a plurality of shim members that cooperate to form at least one annular shim ring coupled to the contact ring and the cover ring. The at least one shim ring can be coaxial with the axis and disposed axially between the second side of the contact ring and the cover member.

According to a further embodiment, the at least one annular shim ring can be a spring configured to bias the contact ring axially toward the stator core.

According to a further embodiment, the at least one annular shim ring can include a plurality of annular shim rings.

According to a further embodiment, the stator positioning device can further include a plurality of pegs. The pegs can be fixedly coupled to the contact ring. Each peg can be received through a corresponding bore in the at least one annular shim ring and into a corresponding bore defined by the cover ring to inhibit relative rotation between the contact ring, the cover ring, and the at least one annular shim ring.

According to a further embodiment, the stator positioning device can further include at least one spring configured to bias the contact ring axially toward the stator core.

According to a further embodiment, contact members that are adjacent to one another in a circumferential direction meet at first junctions, and cover members that are adjacent to one another in the circumferential direction meet at second junctions that are not aligned with the first junctions.

According to a further embodiment, the stator positioning device further includes a plurality of pegs. The pegs can be fixedly coupled to one of the contact ring or the cover ring and can be received in bores defined by the other one of the contact ring or the cover ring to inhibit relative rotation between the contact ring and the cover ring.

According to a further embodiment, the pegs can be fixedly coupled to the contact members.

According to a further embodiment, the plurality of contact members can include a first contact member and a second contact member that define opposite circumferential halves of the contact ring.

According to a further embodiment, the plurality of cover members can include a first cover member and a second cover member that define opposite circumferential halves of the cover ring.

According to a further embodiment, one of the first housing body or the second housing body can include a recess and the other of the first housing body and the second housing body can include a cylindrical boss. The recess can include a first annular end face. The cylindrical boss can include a second annular end face. The cylindrical boss can be disposed within the recess. The cover flange can be disposed within the recess axially between the first and second annular faces.

In another form, the present disclosure provides an electric motor including a first housing body, a second housing body, a rotor, a stator, and a stator positioning device. The second housing body can cooperate with the first housing body to define a motor cavity. The rotor can be supported within the motor cavity for rotation about an axis. The stator can be disposed about the rotor within the motor cavity. The stator can include a stator core having a first end. The stator positioning device can include an annular contact ring, an annular cover ring, and at least one spring. The contact ring can be coaxial with the axis and have a first side and a second side. The first side can be in contact with the first end of the stator core. The cover ring can be coaxial with the axis and coupled to the second side of the contact ring. The cover ring can include a cover flange that extends radially outward of the contact ring and is disposed axially between the first and second housing bodies to inhibit axial movement of the cover ring. The at least one spring can be disposed axially between the contact ring and the cover ring and can bias the contact ring toward the stator core.

According to a further embodiment, the at least one spring can be coaxial with the axis.

According to a further embodiment, the stator positioning device can further include a plurality of pegs. The pegs can be fixedly coupled to the contact ring. Each peg can extend axially through a corresponding one of a plurality of bores defined by the cover ring.

According to a further embodiment, the contact ring can include a plurality of contact members arranged adjacent to each other in a circumferential direction about the axis to define the annular contact ring. The cover ring can include a plurality of cover members arranged adjacent to each other in the circumferential direction about the axis to define the annular cover ring.

According to a further embodiment, the at least one spring can include a plurality of spring members arranged adjacent to each other in the circumferential direction about the axis to define at least one annular spring ring.

According to a further embodiment, contact members that are adjacent to one another in the circumferential direction can meet at first junctions, and cover members that are adjacent to one another in the circumferential direction can meet at second junctions that are not aligned with the first junctions.

According to a further embodiment, the plurality of contact members can include a first contact member and a second contact member that define opposite circumferential halves of the contact ring.

According to a further embodiment, the plurality of cover members can include a first cover member and a second cover member that define opposite circumferential halves of the cover ring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
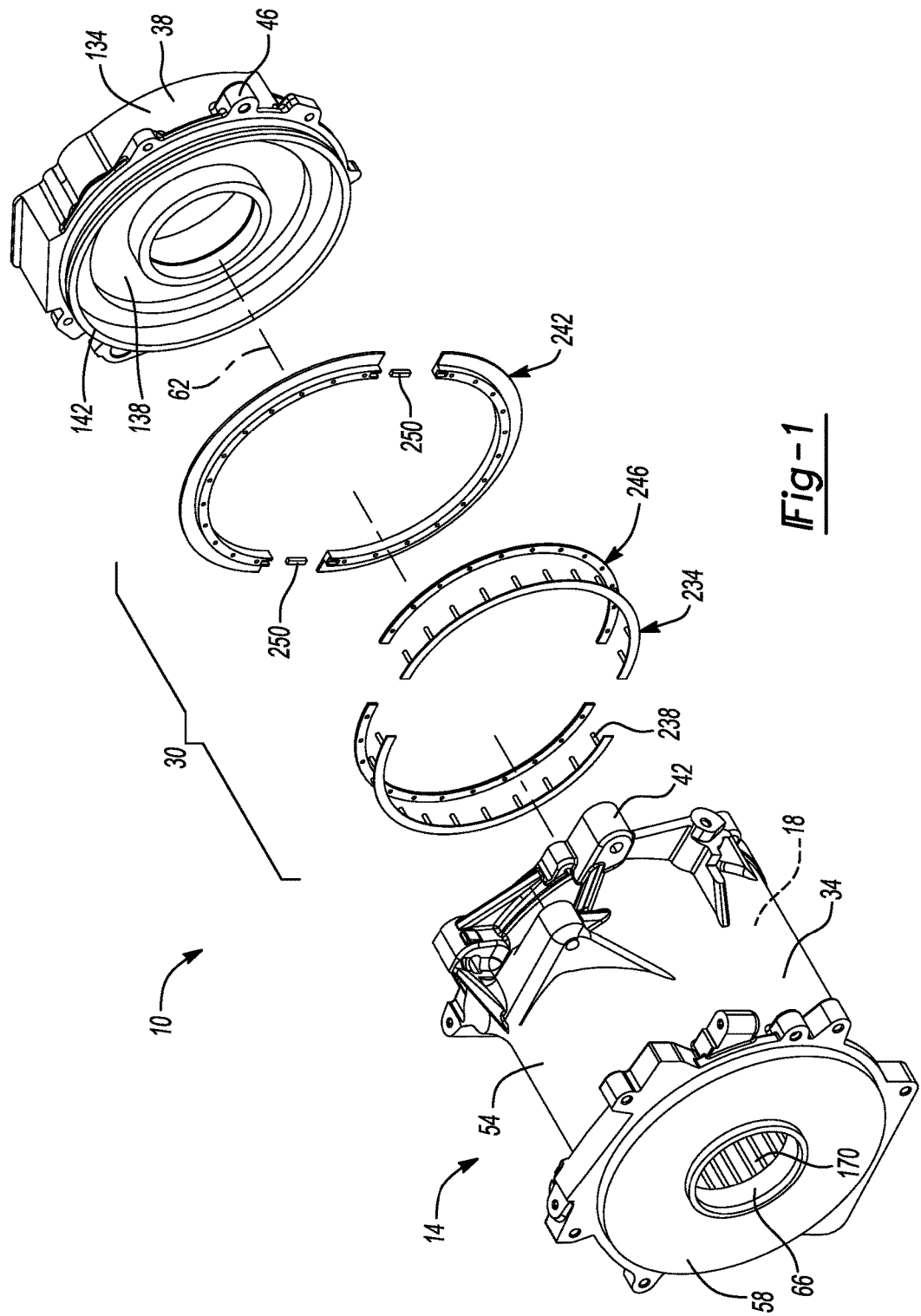
FIG. 1 is a perspective view of a partially exploded view of an electric motor assembly, illustrating a stator crush resistance device constructed in accordance with the teachings of the present disclosure.
Figure 2:
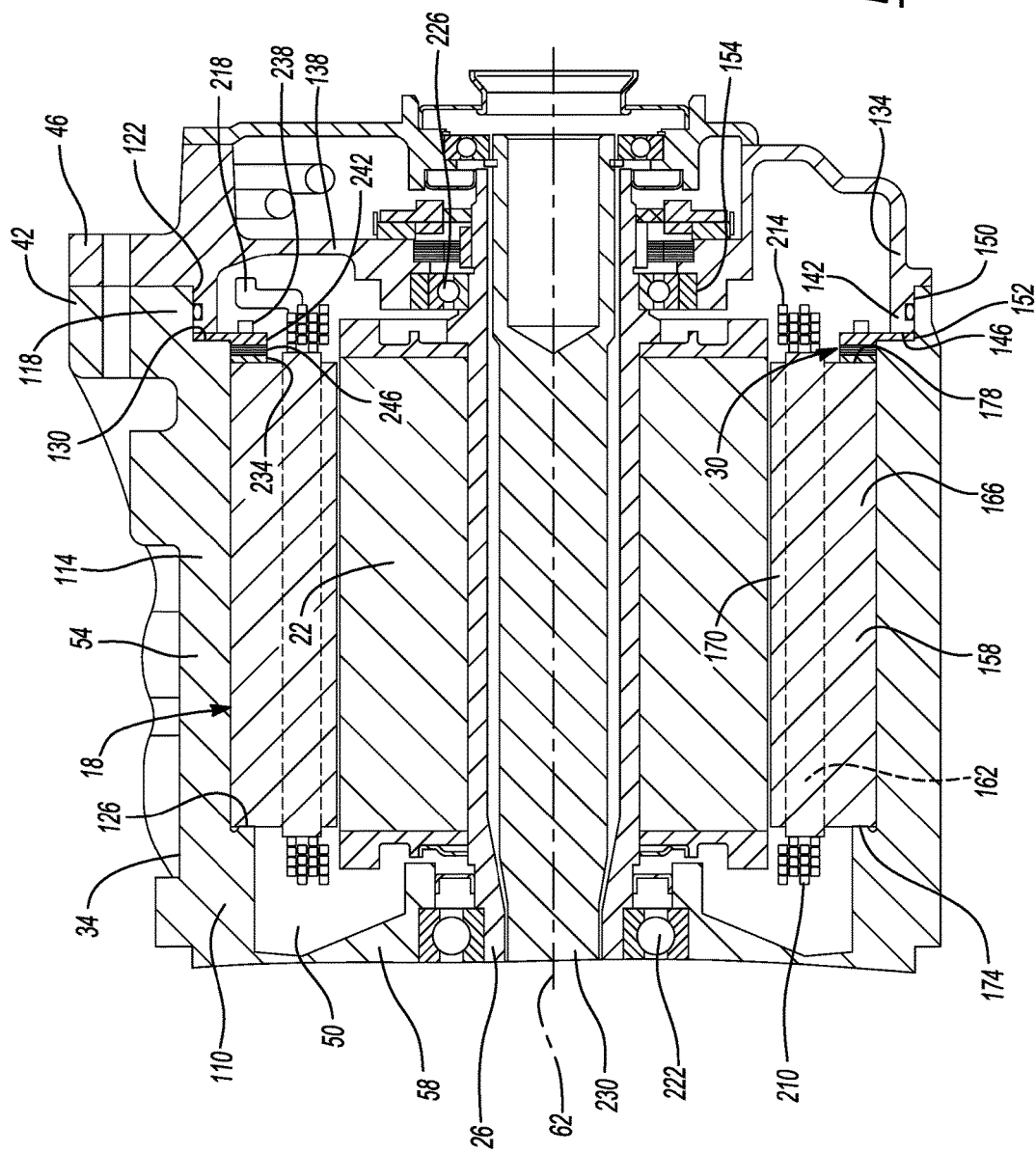
FIG. 2 is a sectional view of a portion of the electric motor assembly of FIG. 1.

With reference to FIGS. 1 and 2, an electric motor assembly 10 is illustrated. The electric motor assembly 10 can include a housing 14, a stator 18, a rotor 22, a motor output shaft 26, and a stator positioning device 30. The housing 14 can include a housing body 34 and an end cap 38 that can be fixedly coupled to the housing body 34. In the example provided, the end cap 38 is mounted to the housing body 34 by a plurality of threaded fasteners (not specifically shown) through a plurality of mounting flanges 42 on the housing body 34 and mating mounting flanges 46 on the end cap 38. The housing body 34 and the end cap 38 can cooperate to define a motor cavity 50, within which the stator 18 and rotor 22 can be disposed. In the example provided, the housing body 34 can include a first outer wall 54, and a first end wall 58. The first outer wall 54 can be disposed about an output axis 62 of the motor assembly 10. The first end wall 58 can extend radially inward from a first axial end of the first outer wall 54 and can include a first output bore 66 coaxial with the output axis 62, such that the first end wall 58 can be annular in shape. The second axial end of the first outer wall 54, which is opposite the first axial end, can be generally open.

In the example provided, the first outer wall 54 includes a first axial portion 110, a second axial portion 114, and an intermediate axial portion 118. The first axial portion 110 can be proximate to the first axial end of the first outer wall 54 and can generally have a first diameter. The second axial portion can be proximate to the second axial end of the first outer wall 54 and can include an inner cylindrical surface 122 having a second diameter. The intermediate axial portion 118 can extend axially between the first and second axial portions 110, 114. The intermediate axial portion 118 can generally have an inner diameter that can be greater than the first diameter and less than the second diameter. The first axial portion 110 can meet the intermediate axial portion 118 to form a first shoulder 126 and the intermediate axial portion 118 can meet the second axial portion 114 to form a second shoulder 130, such that the first outer wall 54 generally expands radially outward at the first and second shoulders 126, 130.

The end cap 38 can include a second outer wall 134 and a second end wall 138. A first end of the second outer wall 134 can engage the second axial end of the first outer wall 54. In the example provided, a first end of the second outer wall 134 can be generally open toward the second end of the first outer wall 54 and can include a boss 142 that is disposed about the output axis 62. The boss 142 can have an end face 146 and a radially outward facing cylindrical surface 150. The end face 146 can face axially to oppose the second shoulder 130. The cylindrical surface 150 can have a diameter that is less than the second diameter, such that the boss 142 is received within the second axial portion 114 of the first outer wall 54. In the example provided, an O-ring disposed about the outward facing cylindrical surface 150 seals the boss 142 with the cylindrical surface 122 of the second axial portion 114. When the end cap 38 is mounted to the housing body 34, the end face 146 can be spaced apart from the second shoulder 130 by a predetermined distance such that the second shoulder 130, the cylindrical surface 122, and the end face 146 can define an annular recess 152 that is open to and extends radially outward from the motor cavity 50.

The second end wall 138 can extend radially inward from a second axial end of the second outer wall 134, which is opposite the first axial end of the second outer wall 134, and can include a second output bore 154 coaxial with the output axis 62, such that the second end wall 138 can be annular in shape.

The stator 18 can include a stator core 158, and a plurality of electrically conductive windings 162. The stator core 158 can include a generally cylindrical body 166 disposed about the output axis 62 and a plurality of stator pole pieces 170 that can extend radially inward from the cylindrical body 166. The stator core 158 can be disposed within the motor cavity 50 and can have an outer diameter that can be greater than the first diameter, but less than the diameter of the intermediate portion, such that the stator core 158 can be inserted into the motor cavity 50 until a first axial end 174 of the stator core 158 abuts the first shoulder 126. Thus, the first shoulder 126 can limit axial movement of the stator 18 in the direction toward the first end wall 58. The stator 18 can be prevented from rotating relative to the housing 14 by engagement between the cylindrical body 166 and the first outer wall 54, such as by splines or keys (not specifically shown) for example.

In the example provided, the stator core 158 can extend axially from the first axial end 174 to a second axial end 178 an axial distance that is less than the axial distance from the first shoulder 126 to the second shoulder 130. In other words, when the first axial end 174 abuts the first shoulder 126, the second axial end 178 can be axially between the first and second shoulders 126, 130.

Figure 4:
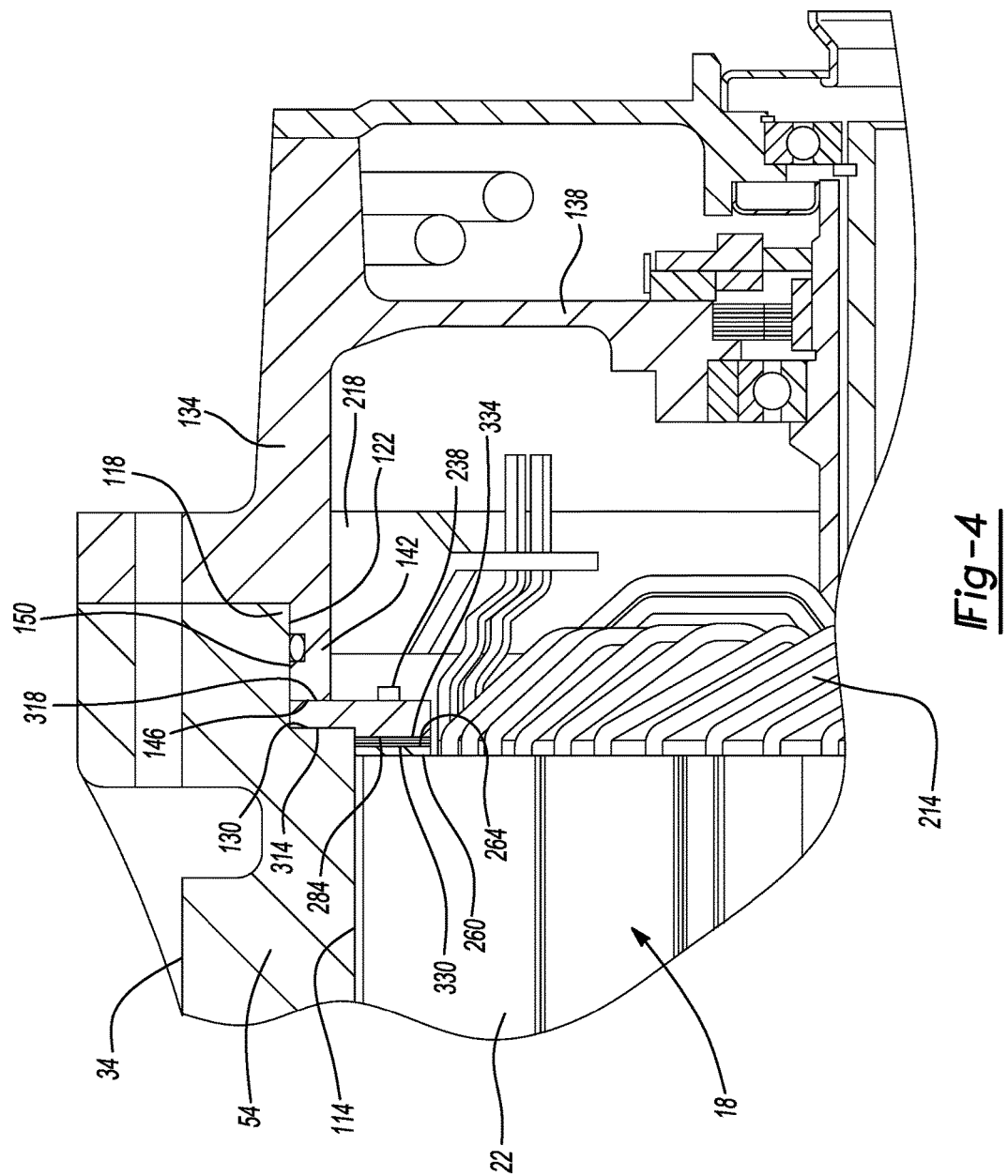
FIG. 4 is a sectional view of a portion of the electric motor assembly of FIG. 1.

With continued reference to FIG. 2 and additional reference to FIG. 4, the windings 162 can be wound around the pole pieces 170 and can extend axially from the first axial end 174 of the stator core 158 to define a plurality of first winding loops 210 and can extend axially from the second axial end 178 of the stator core 158 to define a plurality of second winding loops 214. The first winding loops 210 can extend axially beyond the first shoulder 126 to be disposed in the region of the motor cavity 50 generally defined by the first end wall 58 and the first axial portion 110 of the first outer wall 54. The second winding loops 214 can extend axially beyond the second shoulder 130 to be disposed in the region of the motor cavity 50 generally defined by the second outer wall 134 and the second end wall 138. A portion of some of the windings 162 or other components 218 (best shown in FIG. 4) that are connected to the windings, such as electrical leads for example, can be axially spaced apart from the second axial end 178 of the stator core 158 while extending radially outward of the second winding loops 214.

The rotor 22 can be disposed about the output axis 62 and the stator 18 can be disposed about the rotor 22. The rotor 22 can be supported for rotation about the output axis 62 relative to the stator 18. The rotor 22 can be non-rotatably coupled to the motor output shaft 26 for common rotation about the output axis 62. In the example provided, the motor output shaft 26 is a hollow tube disposed about the output axis 62 and extends axially through the rotor 22 to be supported for rotation relative to the housing 14 by a pair of bearings 222, 226 on opposite axial sides of the rotor 22. The motor output shaft 26 can be drivingly coupled to a torque receiving device (not specifically shown) to provide rotary power thereto. In the example provided, the electric motor assembly 10 can be utilized to provide rotary power to a set of vehicle wheels (not shown), and the motor output shaft 26 can be drivingly coupled to a reduction gearset (not shown) that can drive a differential gearset (not shown). The differential gearset (not shown) can output differential torque to a first output member 230 and a second output member (not shown) that can be drivingly coupled to the vehicle wheels (not shown). In the example provided the first output member 230 can be disposed about the output axis 62, with one end drivingly coupled to a first output of the differential gearset (not shown), and the other end extending through the motor output shaft 26. The second output member (not shown) can also be coaxial with the output axis 62, can have one end drivingly coupled to a second output of the differential gearset (not shown), and can extend in the opposite axial direction from the first output member 230.

Figure 3:
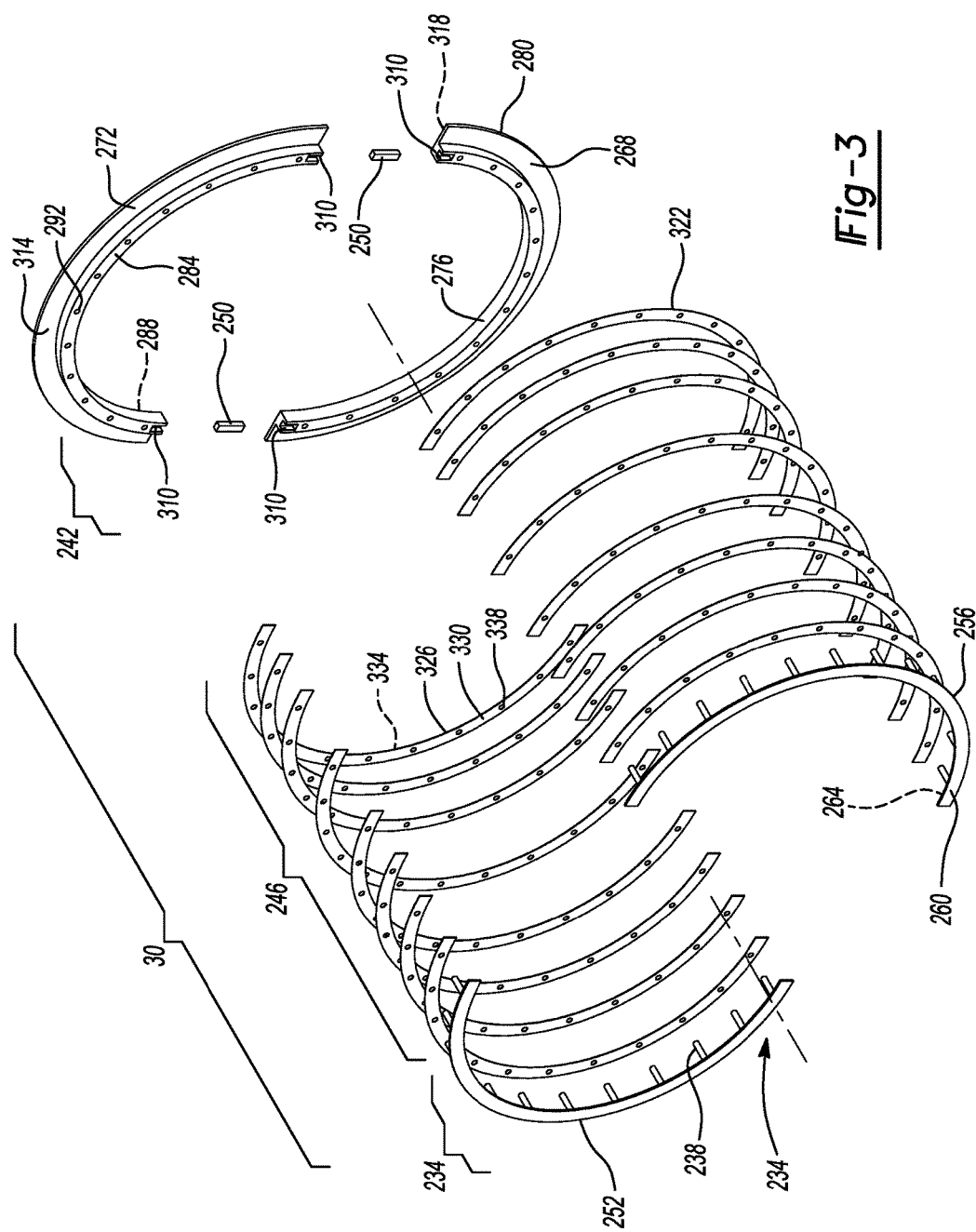
FIG. 3 is an exploded perspective view of the stator crush resistance device of FIG. 1.

With specific reference to FIG. 3, the stator positioning device 30 can include a contact ring 234, a plurality of alignment pegs 238, and a cover ring 242. In the example provided, the stator positioning device 30 can also include a plurality of shim rings 246 and a pair of alignment blocks 250. The contact ring 234 can be annular in shape and coaxial with the output axis 62. The contact ring 234 can include a plurality of contact members that cooperate to form the annular shape of the contact ring 234. In the example provided, the contact ring 234 includes a first contact member 252 and a second contact member 256 that can form opposite halves of the annular contact ring 234 that meet at first junctions. In other words, one end of the first contact member 252 can meet an end of the second contact member 256 and the first and second contact members 252, 256 can extend 180 degrees in opposite circumferential directions about the output axis 62 to meet at their corresponding opposite ends.

Each contact member 252, 256 can have a first side 260 and a second side 264. The contact ring 234 can have an outermost diameter and an innermost diameter such that the contact ring 234 can fit radially between the intermediate axial portion 118 of the housing body 34 and the second winding loops 214 with the first side 260 in contact with the second axial end 178 of the stator core 158. The second side 264 of the contact ring 234 can be opposite the first side 260 such that the second side 264 faces axially away from the second axial end 178 of the stator core 158.

The alignment pegs 238 can be circumferentially spaced about the output axis 62 and can be fixedly coupled to the first and second contact members 252, 256. In the example provided, the alignment pegs 238 are integrally formed with the first and second contact members 252, 256 and extend axially from the second side 264 of each contact member 252, 256. In the example provided, the alignment pegs 238 are equally spaced about the second side 264 of the contact ring 234, though other configurations can be used.

The cover ring 242 can be an annular shape and coaxial with the output axis 62. The cover ring 242 can include a plurality of cover members that cooperate to form the annular shape of the cover ring 242. In the example provided, the cover ring 242 includes a first cover member 268 and a second cover member 272 that form opposite halves of the annular cover ring 242 that meet at second junctions. In other words, one end of the first cover member 268 can meet an end of the second cover member 272 and the first and second cover members 268, 272 can extend 180 degrees in opposite circumferential directions about the output axis 62 to meet at their corresponding opposite ends.

Each cover member 268, 272 can have a hub portion 276 and a flange portion 280 that can extend radially outward of the hub portion 276. The hub portion 276 can have a third side 284 and a fourth side 288 and a plurality of bores 292. The third side 284 can face axially toward the second side 264 of the contact ring 234. The fourth side 288 can be opposite the third side 284 and face axially away from the contact ring 234. The bores 292 can extend axially through the third and fourth sides 284, 288 of the cover ring 242 and can be circumferentially spaced apart about the output axis 62. Each one of the bores 292 can correspond to one of the alignment pegs 238 such that each alignment peg 238 can be received into or through a corresponding one of the bores 292. The alignment pegs 238 can be axially slidable within the bores 292.

In the example provided, each of the hub portions 276 includes a slot 310 open at the third side 284 and open at the second junctions where the ends of the first and second cover members 268, 272 meet. The alignment blocks 250 can be securely received within the slots 310 to assist in aligning and coupling the two cover members 268, 272 together. For example, the alignment blocks 250 can be press-fit into the slots 310 to couple the first and second cover members 268, 272 together. In the example provided the first and second junctions do not align and are rotationally 90 degrees offset from each other, though other configurations can be used. Thus, when the alignment pegs 238 are received in the bores 292, the first and second contact members 252, 256 and the first and second cover members 268, 272 cannot be separated without first removing the alignment pegs 238 from the bores 292.

The hub portion 276 can have an outermost diameter similar to the outermost diameter of the first and second contact members 252, 256 and an innermost diameter similar to the innermost diameter of the first and second contact members 252, 256 such that the hub portion 276 can fit radially between the intermediate axial portion 118 of the housing body 34 and the second winding loops 214.

The flange portion 280 can be fixedly coupled to the fourth side 288 of the hub portion 276 and can have a fifth side 314 and a sixth side 318. The flange portion 280 can have an outermost diameter that is greater than that of the intermediate axial portion 118 and less than or equal to that of the cylindrical surface 122. The fifth side 314 can face in the axial direction toward the contact ring 234 and can be axially between the third side 284 and the fourth side 288 of the hub portion 276. The sixth side 318 can be opposite the fifth side 314 and face away from the contact ring 234. In the example provided, the fourth side 288 and the sixth side 318 are coplanar, though other configurations can be used. The flange portion 280 can be disposed within the recess 152 with the fifth side 314 contacting the second shoulder 130 and the sixth side 318 contacting the end face 146 to prevent axial movement of the cover ring 242 relative to the housing 14.

In the example provided, the stator positioning device 30 can include a plurality of the shim rings 246. Each shim ring 246 can be annular in shape and coaxial with the output axis 62. Each shim ring 246 can include a plurality of shim members that cooperate to form the annular shape of the shim ring 246. In the example provided, each shim ring 246 includes a first shim member 322 and a second shim member 326 that can form opposite halves of the annular shim ring 246 that meet at third junctions. In other words, one end of the first shim member 322 can meet at an end of the second shim member 326 and the first and second shim members 322, 326 can extend 180 degrees in opposite circumferential directions about the output axis 62 to meet their corresponding opposite ends.

Each shim member 322, 326 can have a seventh side 330 and an eighth side 334. Each shim ring 246 can have an outermost diameter and an innermost diameter such that the shim ring 246 can fit radially between the intermediate axial portion 118 of the housing body 34 and the second winding loops 214 with the shim ring 246 being disposed axially between the contact ring 234 and the cover ring 242. The seventh side 330 can face in the axial direction toward the contact ring 234. The eighth side 334 can be opposite the seventh side 330 and face in the axial direction toward the cover ring 242. Each shim member 322, 326 can define a plurality of bores 338 that can extend axially through the seventh and eighth sides 330, 334 and can be circumferentially spaced apart about the output axis 62. Each one of the bores 338 can correspond to one of the alignment pegs 238 such that each alignment peg 238 can be received through a corresponding one of the bores 338. The alignment pegs 238 can be axially slidable within the bores 338.

The shim rings 246 can be positioned axially adjacent to each other such that the seventh side 330 of a first one of the shim rings 246 contacts the second side 264 of the contact ring 234 and the seventh side 330 of subsequent shim rings 246 contacts the eighth side 334 of adjacent ones of the shim rings 246, until the eighth side 334 of a last one of the shim rings 246 contacts the third side 284 of the hub portion 276 of the cover ring 242. In the example provided, the shim rings 246 can be flat shims having a constant predetermined axial thickness. Thus, the number of shim rings 246 can be chosen based on the axial distance between the second axial end 178 of the stator core 158 and the recess 152.

In an alternative construction, not specifically shown, one or more of the shim rings 246 can form springs that can compress and expand in the axial direction along the output axis 62. For example, the shim rings 246 can be wave springs. Thus, the shim rings 246 can bias the contact ring 234 axially toward the second axial end 178 of the stator core 158. In another alternative construction, the axial thickness of the hub portion 276 and/or the contact ring 234 can be configured such that the shim rings 246 are not needed and the second side 264 of the contact ring 234 can contact the third side 284 of the hub portion 276.

During assembly of the motor assembly 10, the separate first and second contact members 252, 256 can be positioned on diametrically opposite sides of the second winding loops 214, axially between the second axial end 178 and the components 218, and then brought together to form the contact ring 234. The separate shim members 322, 326 can also be positioned on diametrically opposite sides of the second winding loops 214, axially between the contact ring 234 and the components 218, and then brought together to form the shim rings 246 which can then be slid onto the alignment pegs 238. The separate first and second cover members 268, 272 can also be positioned on diametrically opposite sides of the second winding loops 214, axially between the shim ring 246 and the components 218, and then brought together to form the cover ring 242 which can then be slid onto the alignment pegs 238.

With the stator positioning device 30 assembled about the second winding loops 214, the end cap 38 can be mounted to the housing body 34 to clamp the flange portion 280 between the second shoulder 130 and the end face 146 with the first side 260 of the contact ring 234 in contact with the second axial end 178 of the stator core 158. Thus, the stator positioning device 30 can support the stator 18 within the housing 14 to prevent relative axial movement between the stator 18 and the housing 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor comprising:
a first housing body;
a second housing body that cooperates with the first housing body to define a motor cavity;
a rotor supported within the motor cavity for rotation about an axis;
a stator disposed about the rotor within the motor cavity, the stator including a stator core having a first end; and
a stator positioning device including:
a plurality of contact members that cooperate to form an annular contact ring that is coaxial with the axis and has a first side and a second side, the first side being in contact with the first end of the stator core; and
a plurality of cover members that cooperate to form an annular cover ring that is coaxial with the axis and coupled to the second side of the contact ring, the cover ring including a cover flange that extends radially outward of the contact ring and is disposed axially between the first and second housing bodies to inhibit axial movement of the cover ring.

2. The electric motor of claim 1, wherein the stator positioning device further includes a plurality of shim members that cooperate to form at least one annular shim ring coupled to the contact ring and the cover ring, the at least one shim ring being coaxial with the axis and disposed axially between the second side of the contact ring and the cover member.

3. The electric motor of claim 2, wherein the at least one annular shim ring is a spring configured to bias the contact ring axially toward the stator core.

4. The electric motor of claim 2, wherein the at least one annular shim ring includes a plurality of annular shim rings.

5. The electric motor of claim 2, wherein the stator positioning device further includes a plurality of pegs, the pegs being fixedly coupled to the contact ring, each peg being received through a corresponding bore in the at least one annular shim ring and into a corresponding bore defined by the cover ring to inhibit relative rotation between the contact ring, the cover ring, and the at least one annular shim ring.

6. The electric motor of claim 1, wherein the stator positioning device further includes at least one spring configured to bias the contact ring axially toward the stator core.

7. The electric motor of claim 1, wherein contact members that are adjacent to one another in a circumferential direction meet at first junctions, and cover members that are adjacent to one another in the circumferential direction meet at second junctions that are not aligned with the first junctions.

8. The electric motor of claim 1, wherein the stator positioning device further includes a plurality of pegs, the pegs being fixedly coupled to one of the contact ring or the cover ring and being received in bores defined by the other one of the contact ring or the cover ring to inhibit relative rotation between the contact ring and the cover ring.

9. The electric motor of claim 8, wherein the pegs are fixedly coupled to the contact members.

10. The electric motor of claim 1, wherein the plurality of contact members includes a first contact member and a second contact member that define opposite circumferential halves of the contact ring.

11. The electric motor of claim 1, wherein the plurality of cover members includes a first cover member and a second cover member that define opposite circumferential halves of the cover ring.

12. The electric motor of claim 1, wherein one of the first housing body or the second housing body includes a recess and the other of the first housing body and the second housing body includes a cylindrical boss, the recess including a first annular end face, the cylindrical boss including a second annular end face, the cylindrical boss being disposed within the recess, the cover flange being disposed within the recess axially between the first and second annular faces.

13. An electric motor comprising:
a first housing body;
a second housing body that cooperates with the first housing body to define a motor cavity;
a rotor supported within the motor cavity for rotation about an axis;
a stator disposed about the rotor within the motor cavity, the stator including a stator core having a first end; and
a stator positioning device including:
an annular contact ring that is coaxial with the axis and has a first side and a second side, the first side being in contact with the first end of the stator core;
an annular cover ring that is coaxial with the axis and coupled to the second side of the contact ring, the cover ring including a cover flange that extends radially outward of the contact ring and is disposed axially between the first and second housing bodies to inhibit axial movement of the cover ring; and
at least one spring disposed axially between the contact ring and the cover ring and configured to bias the contact ring toward the stator core.

14. The electric motor of claim 13, wherein the at least one spring is coaxial with the axis.

15. The electric motor of claim 13, wherein the stator positioning device further includes a plurality of pegs that are fixedly coupled to the contact ring, each peg extending axially through a corresponding one of a plurality of bores defined by the cover ring.

16. The electric motor of claim 13, wherein the contact ring includes a plurality of contact members arranged adjacent to each other in a circumferential direction about the axis to define the annular contact ring, wherein the cover ring includes a plurality of cover members arranged adjacent to each other in the circumferential direction about the axis to define the annular cover ring.

17. The electric motor of claim 16, wherein the at least one spring includes a plurality of spring members arranged adjacent to each other in the circumferential direction about the axis to define at least one annular spring ring.

18. The electric motor of claim 16, wherein contact members that are adjacent to one another in the circumferential direction meet at first junctions, and cover members that are adjacent to one another in the circumferential direction meet at second junctions that are not aligned with the first junctions.

19. The electric motor of claim 16, wherein the plurality of contact members includes a first contact member and a second contact member that define opposite circumferential halves of the contact ring.

20. The electric motor of claim 16, wherein the plurality of cover members includes a first cover member and a second cover member that define opposite circumferential halves of the cover ring.

* * * * *